United States Patent
Stacy (10) Patent No.: US 6,367,358 B1
(45) Date of Patent: *Apr. 9, 2002

(54) DRIVER FOR THREADED FASTENERS WITH SPIRAL DRIVE

(75) Inventor: W. Dodd Stacy, Etna, NH (US)

(73) Assignee: Phillips Screw Company, Wakefield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,156

(22) Filed: Jul. 19, 1999

Related U.S. Application Data (62) Division of application No. 08/961,626, filed on Oct. 31, 1997, now Pat. No. 5,957,645.

(51) Int. Cl.[7] .............................................. B25B 13/48
(52) U.S. Cl. .............................. 81/436; 81/460; 81/452
(58) Field of Search .................................... 81/436, 460

(56) References Cited

U.S. PATENT DOCUMENTS

| | | |
|---|---|---|
| 276,135 A | 4/1883 | Cooley |
| 755,804 A | 3/1904 | Smith |
| 846,981 A | 3/1907 | Clairborne, Jr. |
| 1,080,707 A | 12/1913 | Mackie |
| 1,894,034 A | 10/1933 | Fieg |
| 2,046,837 A | 7/1936 | Phillips |
| 2,066,484 A | 1/1937 | Phillips |
| 2,140,449 A | 12/1938 | Brown |
| 2,248,695 A | 7/1941 | Bradshaw |
| 2,285,460 A | 6/1942 | Purtell |
| 2,362,999 A | 11/1944 | Hewitt |
| 2,397,216 A | 3/1946 | Stellin |
| 2,445,978 A | 7/1948 | Stellin |
| 2,474,994 A | 7/1949 | Tomalis |
| RE24,878 E | 9/1960 | Smith et al. |
| 2,993,950 A | 7/1961 | Forman |
| 3,170,364 A | 2/1965 | Johnson et al. |
| 3,213,719 A | 10/1965 | Kloack |
| 3,237,506 A | 3/1966 | Muenchinger |
| 3,331,274 A | 7/1967 | Walton |
| 3,369,441 A | 2/1968 | Kosar |
| 3,584,667 A * | 6/1971 | Reiland ........................ 81/460 |
| 3,673,912 A | 7/1972 | Herr |
| 3,763,725 A | 10/1973 | Reiland |
| 3,854,372 A | 12/1974 | Gutshail |
| 3,872,904 A | 3/1975 | Barlow |
| 3,874,258 A | 4/1975 | Semola et al. |
| 3,898,706 A | 8/1975 | Rivalland et al. |

(List continued on next page.)

FOREIGN PATENT DOCUMENTS

| | | |
|---|---|---|
| FR | 1245713 | 10/1960 |
| FR | 1339685 | 1/1964 |
| FR | 1457117 | 10/1966 |
| FR | 2321069 | 3/1977 |
| GB | 1234436 | 6/1971 |
| SU | 1249212 | 8/1986 |
| WO | WO 8809708 | 12/1988 |

*Primary Examiner*—David A. Scherbel
*Assistant Examiner*—Hadi Shakeri
(74) *Attorney, Agent, or Firm*—Kirkpatrick & Lockhart LLP (57) ABSTRACT

A spiral drive system for threaded fasteners includes driver-engageable surfaces on the head end of the fastener in which at least some of the driver-engageable surfaces are defined by a spiral segment configured to maximize torque transmission while spreading the driving load over a broad driver-fastener interface to reduce the risk of development of high stress regions. Drivers and related tooling also are disclosed.

17 Claims, 10 Drawing Sheets

U.S. PATENT DOCUMENTS

| | | |
|---|---|---|
| 3,945,071 A | 3/1976 | Flodin |
| 4,037,514 A | 7/1977 | Lliteras |
| 4,073,160 A | 2/1978 | Perret |
| 4,084,478 A | 4/1978 | Simmons |
| 4,146,073 A | 3/1979 | Lliteras |
| 4,151,621 A | 5/1979 | Simmons |
| 4,171,662 A | 10/1979 | Simone |
| 4,187,892 A | 2/1980 | Simmons |
| 4,191,228 A * | 3/1980 | Fenton .................. 81/436 |
| 4,202,244 A | 5/1980 | Gutshall |
| 4,258,596 A | 3/1981 | Bisbing et al. |
| 4,572,039 A | 2/1986 | Desjardins |
| 4,686,874 A | 8/1987 | McCauley, et al. |
| 5,033,501 A | 7/1991 | Stehling |
| 5,137,407 A | 8/1992 | Yamamoto |
| 5,171,117 A | 12/1992 | Seidl |
| 5,207,132 A * | 5/1993 | Goss et al. .................. 81/460 |
| 5,237,893 A * | 8/1993 | Ryder et al. .................. 81/436 |
| 5,279,190 A | 1/1994 | Goss et al. |
| 5,291,811 A | 3/1994 | Goss |
| 5,378,101 A | 1/1995 | Olson et al. |
| 5,435,680 A * | 7/1995 | Schuster .................. 81/436 |
| 5,461,952 A | 10/1995 | Goss |
| 5,509,334 A * | 4/1996 | Shinjo .................. 81/436 |
| 5,598,753 A | 2/1997 | Lee |

\* cited by examiner

DRIVER FOR THREADED FASTENERS WITH SPIRAL DRIVE

RELATED APPLICATION

This application is a divisonal of application Ser. No. 08/961,626 filed Oct. 31, 1997 now U.S. Pat No. 5,957,645).

This invention was made with Government support under contract No. F34601-97-C-0027 awarded by the Department of the Air Force. The Government has certain rights in the invention.

FIELD OF THE INVENTION

This invention relates to drive systems for threaded fasteners, tools for their manufacture and drivers for driving the fasteners.

BACKGROUND OF THE INVENTION

Threaded fasteners commonly used in industrial applications typically are driven by power tools at high speeds and under high torque loads. Such conditions present difficult design considerations, particularly with respect to the drive systems and, more particularly, with threaded fasteners having a driver engageable recess in the fastener head. Ideally, such a drive system should be easily manufactured, both as to recess and head geometry as well as to associated tooling for forming the fastener head and drivers for engaging the recess. The strength of the head of the fastener should not be adversely affected by the recess. The driver should be easily insertable into and easily withdrawn from the recess. The driver and recess, when mated, should distribute the stress loads uniformly to avoid formation of highly localized regions of stress that might result in deformation of the recess, or driver, or both, leading to premature failure of the drive system. The drive system should resist cam-out of the driver from the recess when the fastener is driven. In many applications, it is very important that the fastener must be capable of withstanding several cycles, as in applications where the fasteners must be removed in order to repair or replace parts or to remove and replace access panels. The fastener drive system ideally should be capable of such repeated cycling, particularly in environments where the recess may become contaminated, painted, corroded or otherwise adversely affected in use. In such environments, it is essential that the drive system maintain driving engagement while applying torque in a removal direction. It may be necessary for the drive system to be capable of applying even higher levels of torque when removing the fastener, as may occur when the fastener is over-torqued during initial assembly, or where corrosion develops at the interface at the engaged threads, or if thermal cycling of the assembled components has placed increased stress on the fastener. Where one or more of these, and other, characteristics may present competing considerations, compromises of one in favor of another may be made.

A variety of recess and driver configurations are in common use, including a number of cross-recesses, such as those described in U.S. Pat. No. 24,878 (Smith et al.); U.S. Pat. No. 3,237,506 (Muenchinger) and U.S. Pat. No. 2,474,994 (Tomalis). Other fastener geometries include multi-lobe geometries of the type described in U.S. Pat. No. 3,763,725 (Reiland) and ribbed drive systems as described in U.S. Pat. No. 4,187,892 (Simmons). Also among the common recess configurations is the Allen system which is essentially a straight walled hexagonally shaped socket receptive to a similarly shaped driver. With the exception of the ribbed systems, the walls and faces of the driver and recess typically are designed to fit closely with each other in an effort to achieve face-to-face contact of the driving and driven surfaces. With cross-recess fasteners, such face-to-face engagement can occur only, if at all, when the driver is properly aligned and seated within the recess. As a practical matter, however, in order to enable the driver to be inserted into the recess, there necessarily must be some clearance between the two. The necessity for such clearance is even more critical with recesses having substantially vertical drive walls, as in the Reiland '725 patent and Allen head systems. In all of these systems, the practical result of the necessity for such clearance is that substantial face-to-face, broad area contact between the driver and recess surfaces is seldom achieved, if at all. With most drive systems for threaded fasteners, the driver mates with the recess in the head in a manner that results in point or line contact rather than face-to-face broad area contact. The actual area of contact typically is substantially less than full face-to-face contact. Consequently, when torque is applied by the driver, the forces applied to the screw head tend to be concentrated in localized areas with resulting high localized stresses. Such localized high stress can plastically deform the recess, forming ramps or other deformations resulting in premature, unintended disengagement of the driver from the recess.

The foregoing difficulties have been recognized in the art. For example, U.S. Pat. No. 2,248,695 (Bradshaw) discloses a screw head and driver arrangement in which the driving and driven faces of the driver and fastener, respectively, are curved and located eccentrically with respect to the screw axis. In the Bradshaw fastener, any "suitable curvature" such as circular or log spiral may be used as long as it is oriented to bind or lock together by frictional engagement. Notwithstanding Bradshaw's teachings, later fastener drive systems, as those referred to above, do not appear to have adopted the Bradshaw teaching of relying on frictional engagement.

It is among the general objects of the invention to provide a drive system for a threaded fastener that achieves many of the desirable characteristics for threaded fastener drive systems with less compromise of competing characteristics than has been the case with the prior art.

SUMMARY OF THE INVENTION

The advantages of the invention may be achieved by configuring the driving and driven surfaces of the driver and fastener, respectively, to conform to a segment of a spiral and, particularly, in a spiral configuration that enables a substantial and generous clearance between the driver and the recess during insertion and removal of the driver but in which the fully seated driver is permitted to rotate to take up that clearance. The spiral configurations of the drive walls of the driver and the driver-engageable walls of the recess are such that when the spiral walls engage, they do so over a relatively broad area thereby applying and distributing the stress over that broad area. The spirally configured driving and driven walls are oriented to direct a major portion of the applied torque substantially normal to the fastener radius with little, if any, reliance on frictional, near-tangential engagement. The drive walls of the driver and the driver-engageable walls of the recess may be formed to be as close to vertical as is practical, although some draft angle of several degrees may be acceptable. The configuration of the drive walls enables high levels of torque to be delivered without inducing substantial axially directed cam-out forces tending to urge the driver axially out of the recess. By so minimizing the tendency for cam-out, the recess may be relatively shallow, thereby resulting in a stronger screw head than would be the case with a deep, conventional recess.

A recess embodying the invention preferably includes a central portion and a plurality of generally radial wings, at least two of which have at least one heightwise extending, spiral driver-engageable wall. Recesses may be provided in which the spiral drive surfaces engage only in an installation direction, or only in a removal direction, or in both installation and removal directions. Additionally, the spiral surfaces may be arranged to have different arc lengths and orientations so that the torque capacity can be higher in one direction than in the other. A screw thus can be made capable of transmitting higher torque loads in a removal direction than in the installation direction so that sufficient torque can always be applied to overcome the torque that was previously applied during installation.

In a further aspect of the invention, the spiral configuration of the engageable driver and recess faces is configured and located with respect to the longitudinal axis of the screw so that when the driver face meets its associated recess face, it will tend to do so uniformly along the common engaging area of the those faces. The spiral configuration of the driver face preferably is substantially identical to that of the recess face. Consequently, when the driver is rotated to bring its spiral face into engagement with the driven face of the recess, the full surface area of the driver will engage the corresponding full surface area of the recess. So engaged, continued torque will be applied from the driver to the recess with the major proportion of the force being applied in a direction substantially perpendicular to the radius of the fastener. The transverse cross-sectional contour of the driver is somewhat smaller than that of the recess so as to leave a generous clearance that enhances the ability for the driver to be inserted and removed from the recess. The spirally configured driver surfaces enable the clearance to be taken up during the initial portion of driver rotation so that when the driver and recess drive walls engage they will do so in broad face-to-face contact. In its most preferable form, the mating spiral faces of the driver and recess are configured and oriented so that their spiral faces will substantially parallel each other throughout the range of permitted free rotation of the driver within the recess. In a still further aspect of the invention, the spiral engageable walls of the driver and recess are confined to the region of the spiral at its innermost portion. The initial point of the spiral may be located at a defined radius from the longitudinal axis of rotation of the fastener and the length of the spiral extends to a point that is a multiple of that initial radius, up to about three or three and one-half times the initial radius.

In another aspect of the invention a punch is provided for forming a recess in the head of a fastener blank in which the punch includes a main body having an end contoured to form a portion of the fastener head and a nib adapted to form the spiral recess of the invention in a conventional two-blow header technique. The radial extending wings of the nib may include one or two spiral surfaces adapted to form complementary spiral surfaces when impacted against the head end of the fastener. In a further aspect of the invention, the drive system may be used with externally driven fasteners in which the driving tool defines the recess and the driven surfaces on the fastener are defined by peripheral surfaces on the fastener head.

It is among the objects of the invention to provide a drive system for a threaded fastener by which torque can be effectively transmitted while minimizing localized stresses in the screw head and the driver.

Another object of the invention is to provide a drive system for a threaded fastener in which the driver engageable surfaces in the fastener are formed with a spiral contour and are adapted to be engaged by identically spiral contoured driver elements.

A further object of the invention is to provide a drive system for a threaded fastener in which the driving and driven faces of the driver and fastener respectively provide a generous clearance between the driving surfaces when the driver is fully inserted in the recess while still enabling broad face-to-face driving contact of the driver and recess drive walls.

Another object of the invention is to provide novel tooling for a drive system for threaded fasteners.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATIVE EMBODIMENTS

Figure 1:
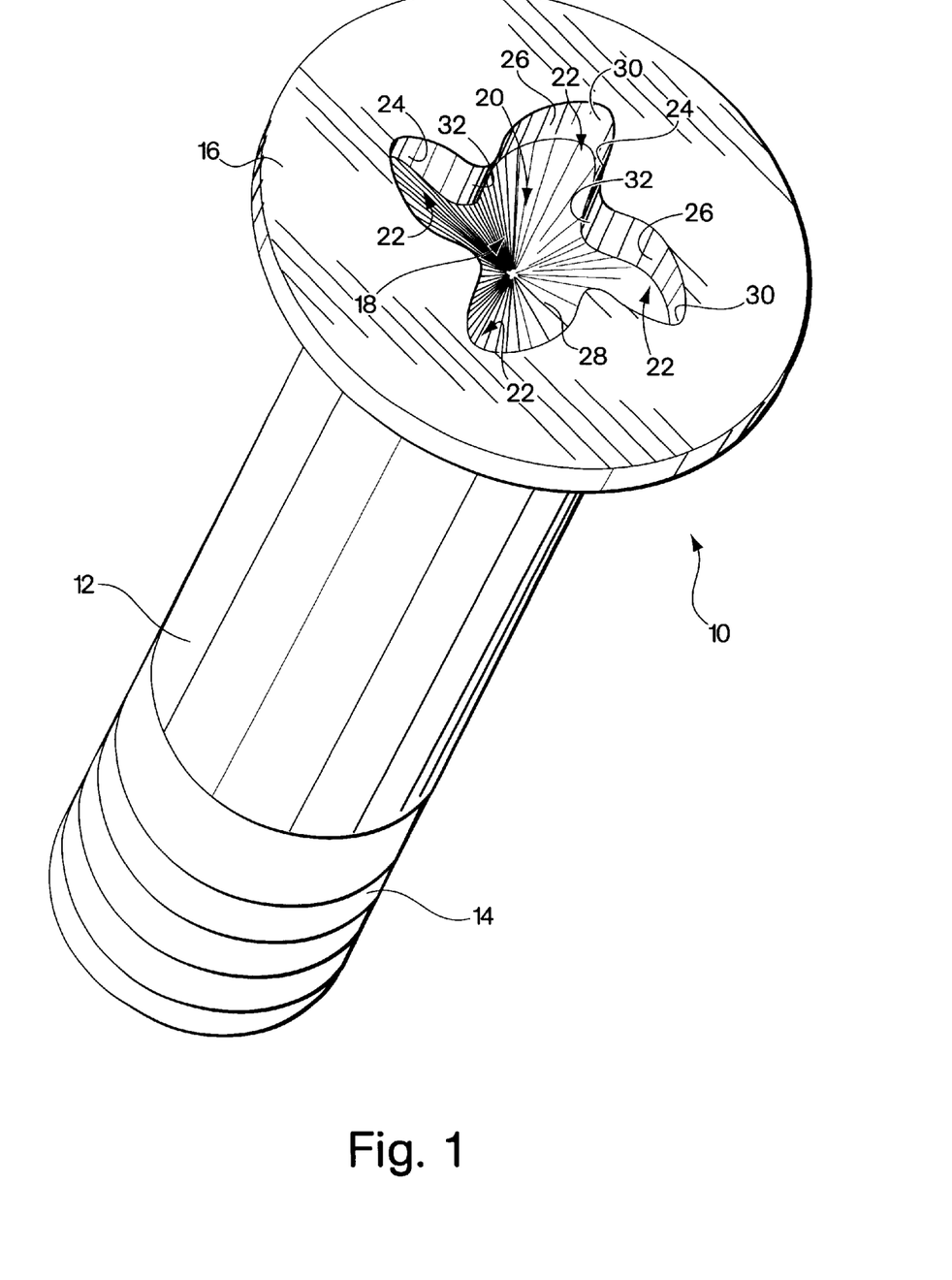
FIG. 1 is an illustration of a flat head screw having a recess in accordance with the invention.

FIG. 1 illustrates an exemplary threaded fastener 10 having a shank 12 with threads 14 formed at one end and a head 16 with a recess 18 formed at the other end. The head 16 may be formed in a conventional two-blow header machine in which the end of the wire or other material from which the fastener is made is supported in a die of the header machine and its head end is impacted, first with a punch that partially forms the head, and then with a finishing punch that finishes the head and forms the driver-engageable recess. The recess 18 is illustrated as having a central portion 20 and a plurality of radially outwardly extending lobes (wings) 22. The recess in the embodiment of FIG. 1 is formed so that each of its wings 22 has an installation wall 24 (assuming a right-handed thread 14) and a removal wall 26. The installation wall 24 and removal wall 26 preferably are formed to be substantially vertical, defining or closely approximating a cylindrical surface parallel to the longitudinal axis of the screw. The installation and removal walls, and other surfaces of the recess, may be formed to include some positive draft, that is, they may diverge slightly in a direction from the bottom to the top of the recess. By way of example, a positive draft of up to about 6° should not adversely affect the torque transmission capability of the system for many applications. The bottom of the recess may be defined by a conical bottom wall 28. The radially outer end of each wing may be contoured to provide a smoothly curved transition between the installation wall 24 and removal wall 26 of the wing. The recess also includes an inner transition wall 32 between the installation wall 24 of one wing 22 and the removal wall 26 of the next adjacent wing 22. It should be understood that the invention may be incorporated in threaded fasteners in a wide variety of configurations including recesses having one or more wings in which only one of the installation or removal walls 24, 26 is provided with a spirally contoured segment.

Figure 2:
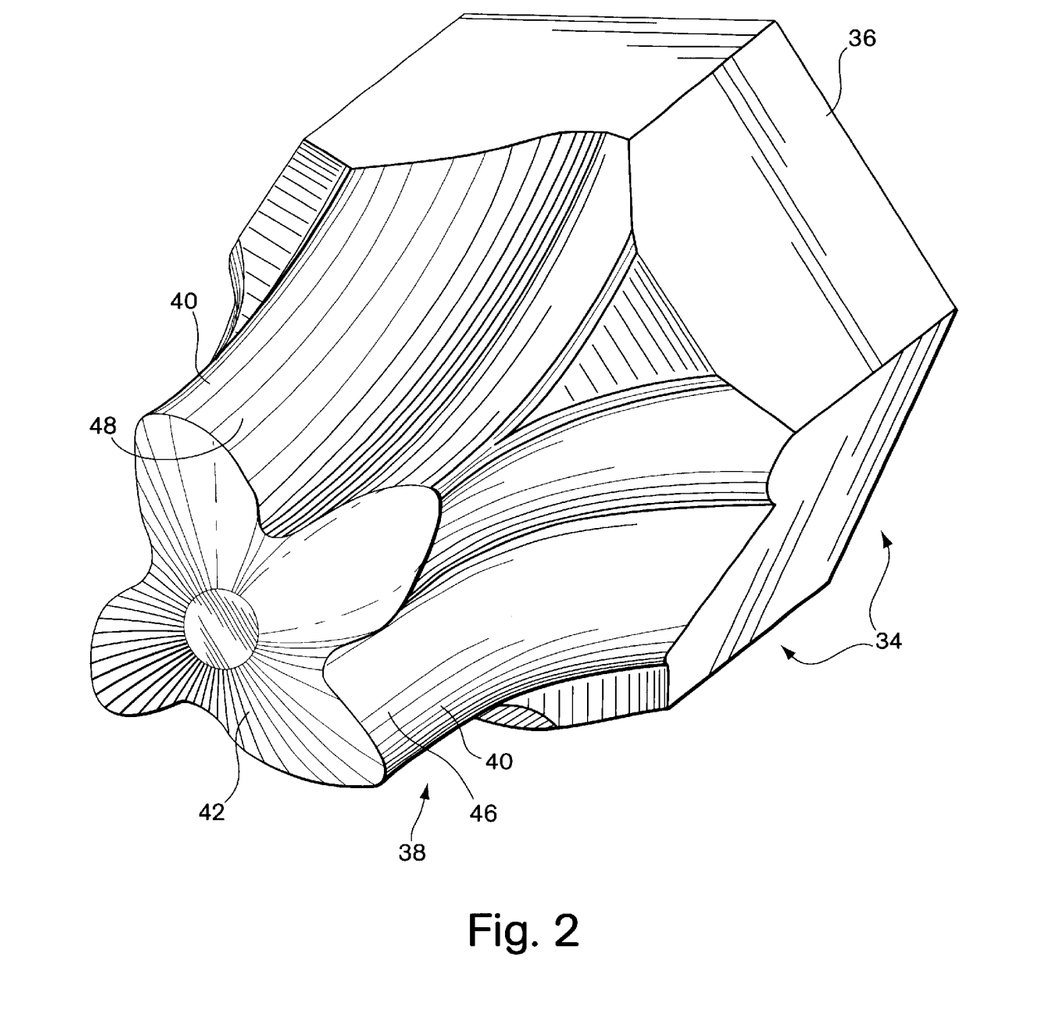
FIG. 2 is an illustration of the driver in accordance with the invention adapted for engagement with the recess of the screw shown in FIG. 1.

FIG. 2 shows a driver 34 configured for engagement with the multiwing spiral recess illustrated in FIG. 1. The driver 34 may be considered to include a shank 36 and a multiwing nib 38 formed at the end of the shank 36. The nib 38 includes a central portion 42 (See FIG. 2) from which a plurality of wings 40 radiate. The end wall 42 of the driver may be formed in a conical or other configuration. Preferably, the end wall 42 is configured so that when the driver 34 is fully seated in the recess 18, some clearance will remain between a portion of the end wall 42 and the bottom wall 28 of the recess. Each of the wings may be considered as having an installation wall 46 and a removal wall 48.

Figure 3:
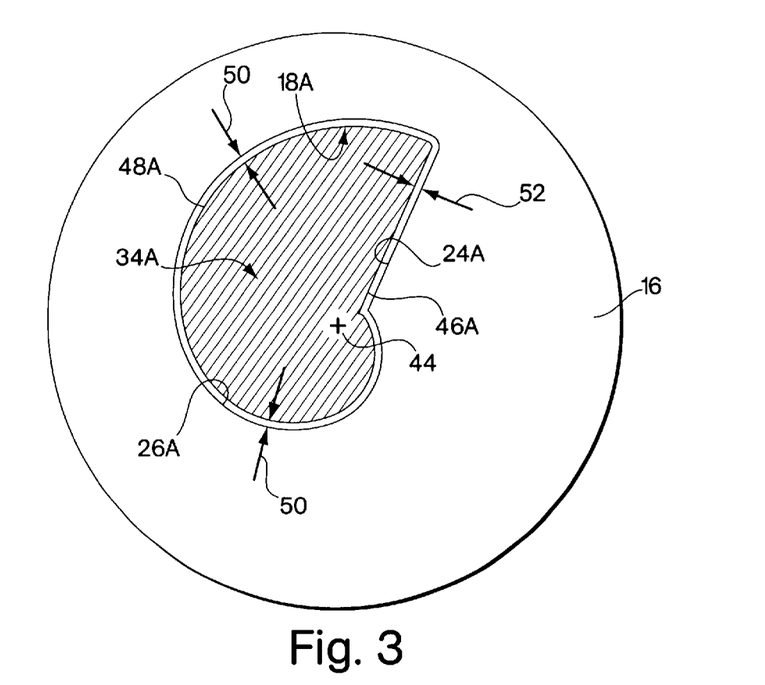
FIG. 3 is a top view of the head of a screw having, for ease of explanation, a simplified single lobe spiral recess in accordance with the invention with a driver, shown in section, within the recess.
Figure 4:
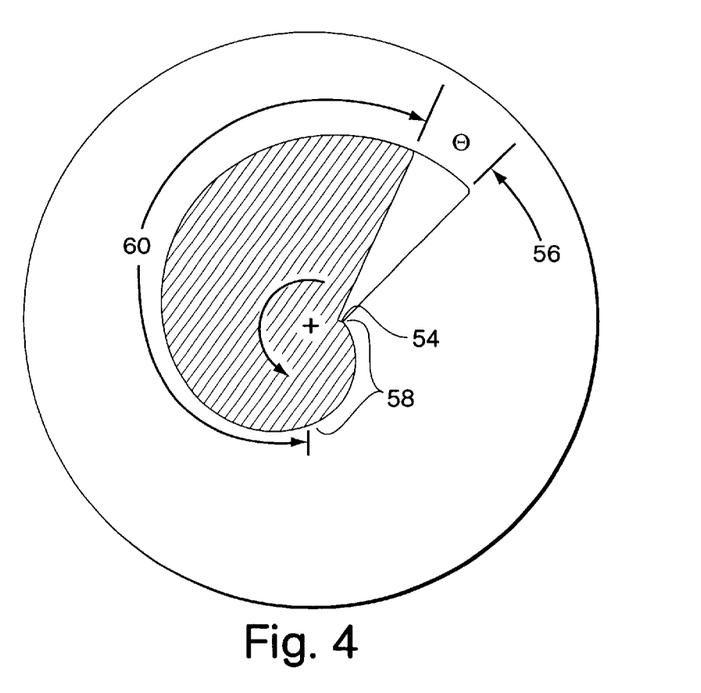
FIG. 4 is an illustration similar to FIG. 3 in which the driver has been rotated relative to the screw to engage the spiral face of the driver with the spiral face of the recess.

Although it is contemplated that most, but not necessarily all, applications will employ a multiwinged recess and driver, the principles of the invention may be illustrated and appreciated with reference to a simplified single lobe embodiment shown diagrammatically and in exaggeration, in FIGS. 3 and 4. The screw head 16, shown in plan, is provided with a single lobe recess 18A defining an installation wall 24A and a removal wall 26A (assuming a right-hand threaded fastener). For ease of explanation, the removal wall 26 is formed in a spiral configuration in that its intersection with a plane perpendicular to the fastener axis 44 defines a spiral. The installation wall 24A is illustrated as being substantially flat, extending in a general radial direction from the initial point to the outer end of the spiral. The driver 34A is illustrated in section taken along the plane perpendicular to the axis 44 of the fastener at the top surface of the fastener head 16. The simplified single lobed driver 34A may be considered to have an installation wall 46A and a removal wall 48A both of which are essentially identical in cross-section geometrical shape to the installation wall 24A and removal wall 26A of the recess 18A. The removal wall 48A of the driver 34A is formed to define substantially the same spiral as that of the recess wall 26A. At least that portion of the nib of the driver 34A that is received within the envelope defined by the recess has walls oriented to parallel the corresponding walls of the recess. The driver is dimensioned with respect to the recess so that when seated in the recess, a substantially uniform clearance 50 may exist between the corresponding drive walls of the driver and the recess. The clearance 50 between the recess and the driver is generous and should be selected to assure that the driver can be easily inserted into and removed from the recess under a broad range of operational conditions, including the presence of contaminants, corrosion or the like in the recess.

FIG. 4 is a diagrammatic illustration of the driver and recess of FIG. 3 with the driver having been rotated counterclockwise to engage the spiral removal wall 48A of the driver with the substantially paralleling spiral wall 26A of the recess. From FIG. 4 it can be seen that when the driver has been rotated to engage its spiral surface with that of the recess, the gap 50 between the spiral removal walls of the driver and recess is fully taken up while the gap 52 between the installation walls of the driver and recess increases to define an angle θ that corresponds to the amount of rotation necessary to rotate the driver into full engagement with the recess. Thus, as the driver is rotated in a direction of decreasing spiral radius, the clearance 50 is eliminated and the spiral surfaces engage fully over a broad surface area. In accordance with the invention, the spiral curve is selected and oriented to enable transmission of high torque. Ideally, the complete spiral surface of the driver engages the complete spiral surface of the recess simultaneously over substantially the full surface area. Such engagement avoids the development of points of high stress concentration, distributing the applied load broadly and uniformly.

It should be understood that in the exaggerated diagrammatic single lobe illustration of FIGS. 3 and 4, the spiral continues from its initial point, indicated at 54 in FIG. 4, to its terminal point, indicated at 56 in FIG. 4. In accordance with the invention, mating faces of the driver and the recess are arranged to conform to the more inwardly disposed portions of the spiral than the more outwardly disposed portions because the more inwardly disposed portions will transmit a greater portion of the applied force as torque, rather than as a radially outwardly directed force that does not contribute to driving the fastener. Thus, it may be seen from FIG. 4 that the more radially inwardly disposed portion of the spiral, suggested, for example, at 58, will transmit more of the applied force to torque the fastener than for the more radially outward portion of the spiral, as 60, in which a substantially larger component of the applied force is directed in a radially outward direction and substantially less is in torque. It is an important aspect of the invention that the spirally configured walls be arranged so that their more radially inward regions are employed. Thus, in practical application, a fastener made in accordance with the invention would include that segment of the spiral indicated at 58 while that portion represented by segment 60 should not be employed. As described below in further detail, the spiral surfaces are oriented with respect to the longitudinal axis 44 of the screw so that the major portion of the torque applied by the driver to the fastener will serve to rotate the fastener rather than apply the radially outward force. As shown, the torque transmission in a removal direction would be greater than that which would be applied in an installation (clockwise) direction. In accordance with the invention, the orientation of the spiral surfaces may be varied to provide the desired proportion between installation and removal torque capabilities, depending on the particular application for the fastener.

Figure 5:
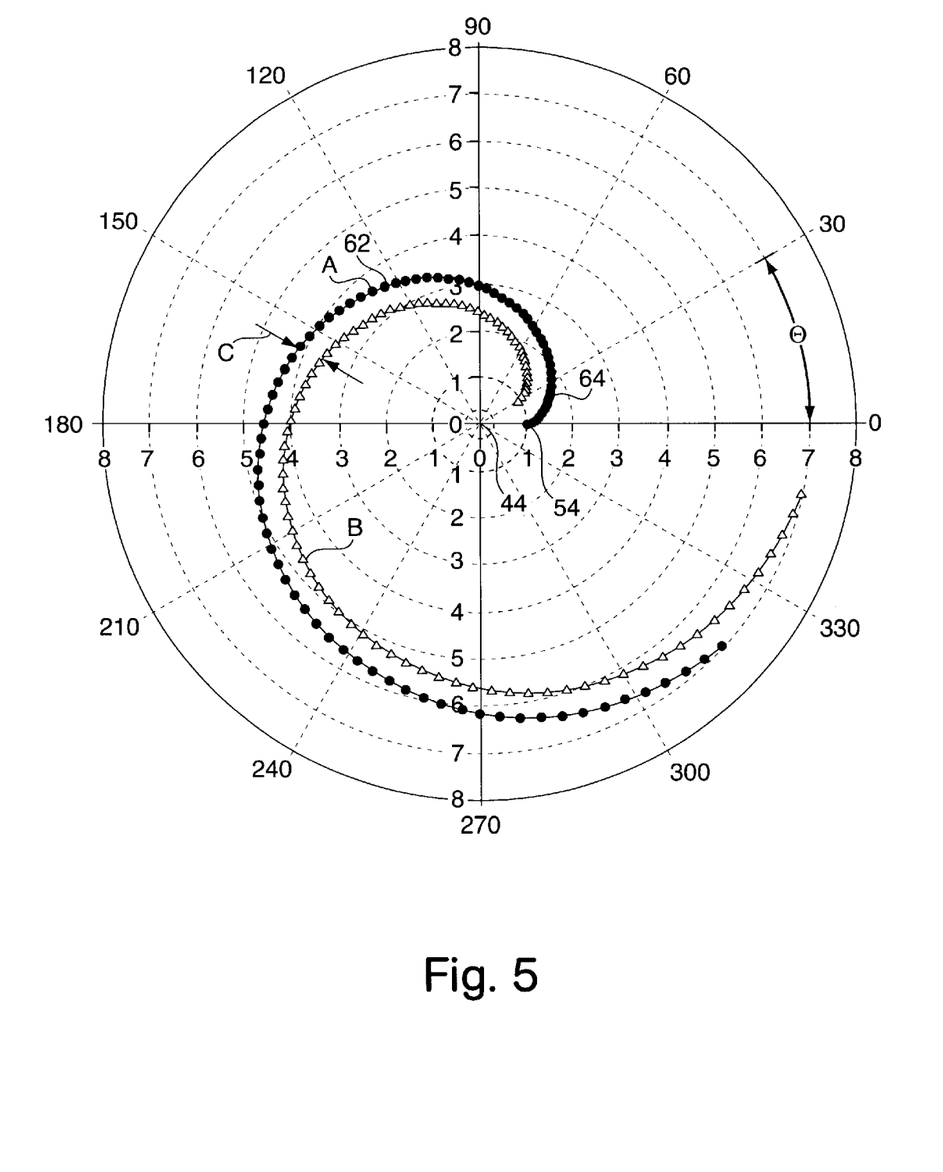
FIG. 5 is a polar coordinate diagram of a constant gap spiral that defines the most preferable shape for engageable driver and recess walls in accordance with the invention.

FIG. 5 illustrates, in polar coordinates, an ideal spiral having desirable characteristics for use in the invention in that it can be oriented with respect to the axis of rotation corresponding to the longitudinal axis of a threaded fastener and that, when so rotated, as through an angle θ, will remain parallel to and spaced from the unrotated spiral. As shown in FIG. 5, the ideal spiral indicated at position A, when rotated through an angle θ to the position indicated at B, will remain parallel to that of position A but will be spaced from that of position A by a gap indicated at C. Although the magnitude of the gap C will increase as the rotation angle θ is increased, for any given angle of θ, the gap C will remain constant over the spiral length. The geometry of the constant gap spiral is defined by the following equation, expressed in polar coordinates:

$$\theta = \sqrt{(R/R_i)^2 - 1} + \text{Arcsin}(R/R_i)^{-1} - (\pi/2)$$

where:

θ=the rotation angle (in radians) of a ray crossing the curve at a distance r from the axis of rotation;

$R_i$=the initial radius as measured from the axis of rotation to the initial point of the spiral; and R=the radius of the spiral at a rotation angle θ, also measured from the axis of rotation.

From the foregoing, it will be appreciated that when the driver is formed with drive walls embodying the constant gap spiral and is driven to engage the spiral walls of the recess, the spiral drive wall on the driver will engage fully and simultaneously, the corresponding spiral drive wall on the recess. It should be understood that, as described above in connection with FIG. 4, the polar coordinate graph of FIG. 5 is intended merely to illustrate an ideal spiral in which the gap between rotated positions of the spiral is constant so that the spirals may be considered as paralleling.

In accordance with the invention, the spiral face(s) on the drive wall of a wing of the recess is located so that the initial point 54 of the spiral is radially spaced from the central axis 44 of the recess by a radius $R_i$. In accordance with the invention, those portions of the spiral faces that are located closer to the initial point 54 will transmit a greater portion of the applied torque in a direction that will rotatably drive the screw than more outwardly located portions. The spiral driver face and driver engageable recess will be most effective in transmitting torque by configuring those faces to conform to the portions of the spiral that are more closely disposed to the initial point 54. In accordance with the invention, the force transmitting walls should be curved to conform to that portion of the spiral that extends from R=1 on FIG. 5 to no more than about R=3.5 (indicated at point 62) and, more preferably, within the range of R=1 to about R=2. Considered in terms of the angle of the circular arc subtended by the desired inner portion of the spiral, the angle may include, at a maximum, about 125°, more preferably about 90° or less and, most preferably, about 45° or less.

Figure 6:
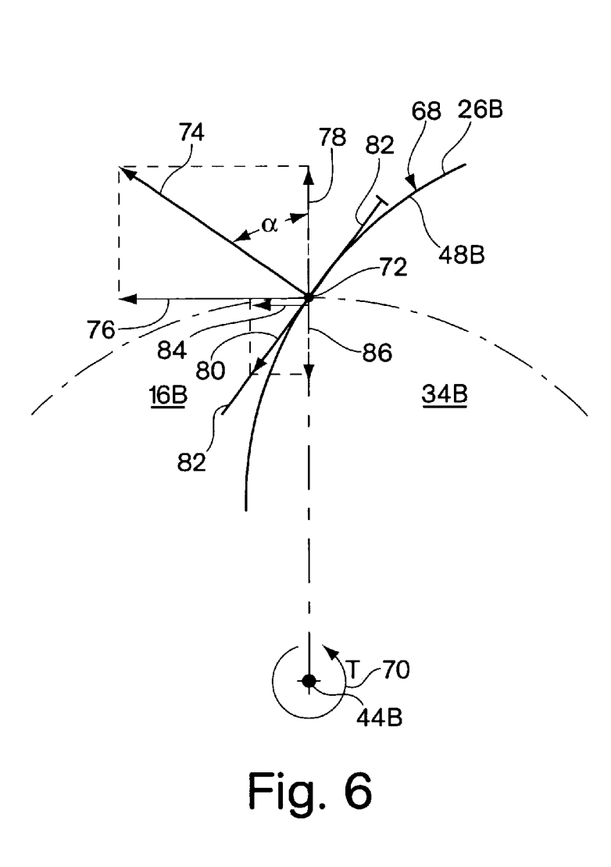
FIG. 6 is a force diagram illustrating the balance of forces between the driver and the recess of the present invention while torque is applied to the fastener by an inserted driver.
Figure 7:
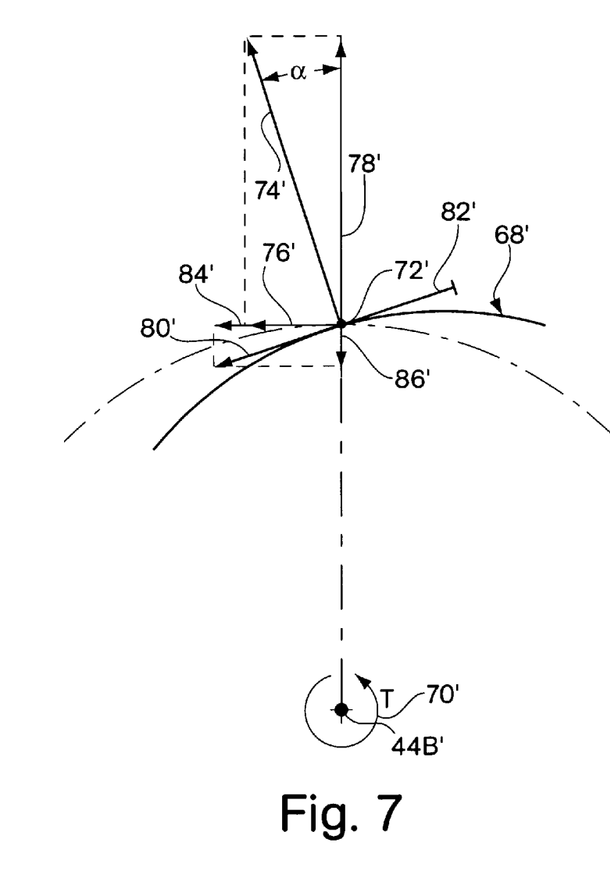
FIG. 7 is a force diagram similar to FIG. 6 illustrating the component forces developed between a prior art driver and recess in which the design of the system relies on frictional engagement between the driver and the recess.
Figure 8A:
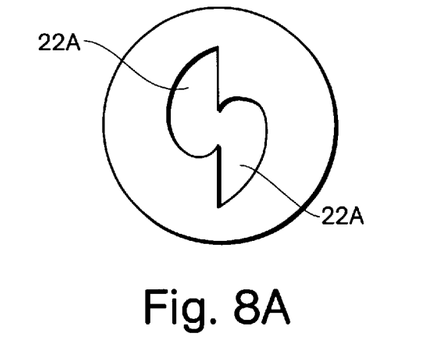
FIGS. 8A–8E illustrate, diagrammatically, top views of fastener heads having multiple wing recesses in which the spirally contoured recess walls are engageable by a driver rotated in a counterclockwise direction.
Figure 8B:
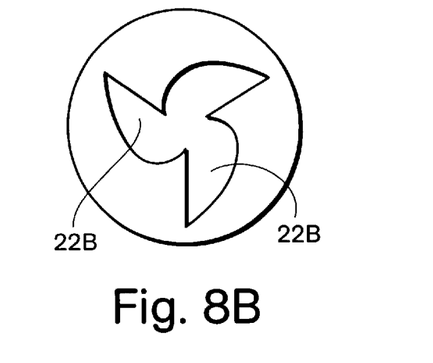
Figure 8C:
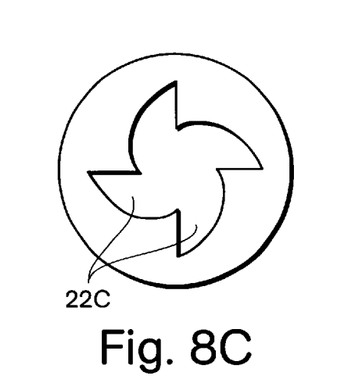
Figure 8D:
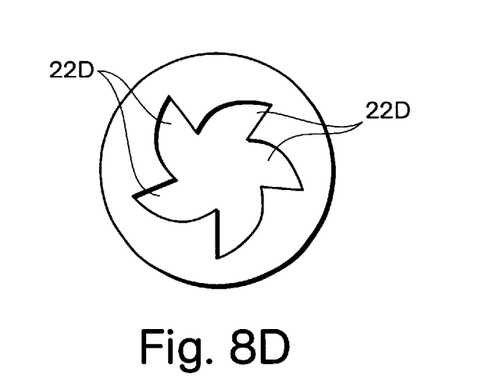
Figure 8E:
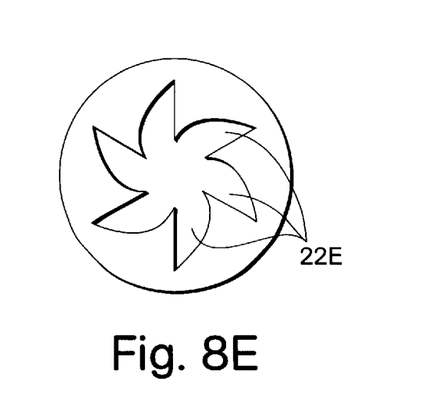
Figure 9A:
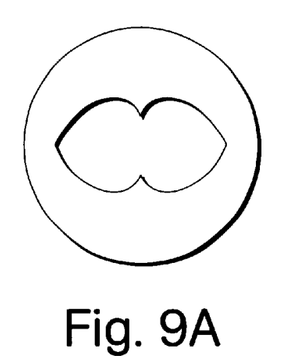
FIGS. 9A–9D are diagrammatic illustrations of spiral shaped recess configurations having multiple wings with the installation and removal walls of the wings, each being provided with a spiral configuration.
Figure 9B:
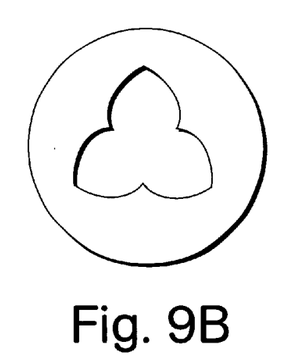
Figure 9C:
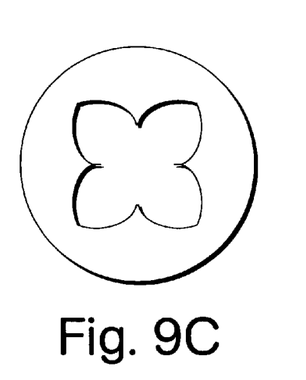
Figure 9D:
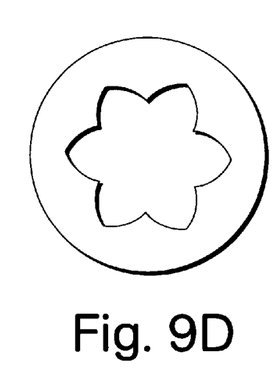

FIGS. 6 and 7 are force diagrams showing the force components acting at an arbitrary point along a curved surface of an engaged driver and recess walls. FIG. 6 illustrates a force diagram for the present invention. FIG. 6 shows a driver 34B having a removal drive wall 48B in face-to-face engagement, along the curved interface 68, with the removal wall 26B of a recessed fastener head 16B. FIG. 6 represents, diagrammatically, the force vectors when a counterclockwise torque, as suggested at 70 is applied, about the axis 44B of the screw. At a selected point of interest 72, the driver 34B applies a force 74 to the recess face 26B along a direction that is normal to the interface 68. Normal force 74 resolves into a component 76 that applies only torque to the screw and another component 78 that generates radially outward compressive stress, but no torque. Additionally, the normal force 74 results in the development of a frictional force 80 directed along a tangent 82 to the interface 68. The frictional force 80, in turn, resolves into a component 84 that is additive to the torque component 76 and another component 86 that opposes and is subtractive with respect to the radial outward component 78. The magnitude of the frictional force 80 relative to the normal force 74 depends on the coefficient of friction that, of course, will vary with the surface smoothness, lubricity and material of the screw. The coefficient of friction may, for example, range between about 0.1 and 0.4, with a coefficient of friction of 0.4 having been selected in the development of the force diagrams of FIGS. 6 and 7. Thus, FIG. 6 illustrates that with the geometry of the drive and driven walls of the present invention, the torque is produced primarily by the normal force component 108, even with a high frictional coefficient, assumed for purposes of illustration. The torque transmission capability of a fastener embodying the invention does not depend, to any significant degree, on the vector component 84 of the frictional force.

FIG. 7 is a force diagram similar to that of FIG. 6 but depicting the effect of a driver-recess curved interface 68' that is oriented so that a tangent 82' to the curved interface 68' at a point 72' will be oriented more nearly perpendicular to a radius drawn from the screw axis 44B' to the point 72'. Such an arrangement is typified by that described in Bradshaw U.S. Pat. No. 2,248,695. From a comparison of FIG. 7 with FIG. 6, it will be apparent that prior art configuration results in a substantially higher radially outward loading of the screw head, as evidenced between the differences in length of the vector components 78' and 86', and is primarily dependent upon variable and often unpredictable frictional phenomena for producing torque. The reliance, in the prior art, on friction is apparent by comparing the relative contributions of the frictional component 84' with the component 76'. From the foregoing, it may be appreciated that a line perpendicular to a tangent to the spiral segment will make an angle α to a radius from the longitudinal axis to the point of tangency representative of the degree to which the force applied by the driver will be transmitted as torque to the fastener. In applicants' invention, that angle α should not be less than 17° and, preferably, is substantially more than 17°. Among the significant objectives of the present invention is to provide a drive system by which high torque can be transmitted from a driver to the fastener with reduced risk of yielding or fracturing the screw head and without significant reliance on frictional characteristics.

FIGS. 8A–8E illustrate, diagrammatically, recessed head fasteners embodying the invention and including two to six wings 22A–22E. In these embodiments, the recesses are configured to have the spiral shaped contour on the removal walls to favor greater torque application in a removal direction than in an installation direction. In these diagrammatic illustrations, the installation walls are shown as being substantially flat, although it should be understood that the installation wall may take any desirable shape, including a spiral shape in accordance with the invention.

FIGS. 9A–9D illustrate the use of the invention in a bidirectional spiral drive system adapted to develop substantially the same torque both in removal and installation directions. In these embodiments, the removal walls and installation walls of one or more of the wings are each provided with spiral contours oriented in opposite directions to provide the characteristics attendant to the spiral contoured drive wall, both in the installation and removal direction. In the embodiments illustrated in FIGS. 9A–9D, the installation and removal walls of a wing may be essentially mirror images of each other.

Figure 10A:
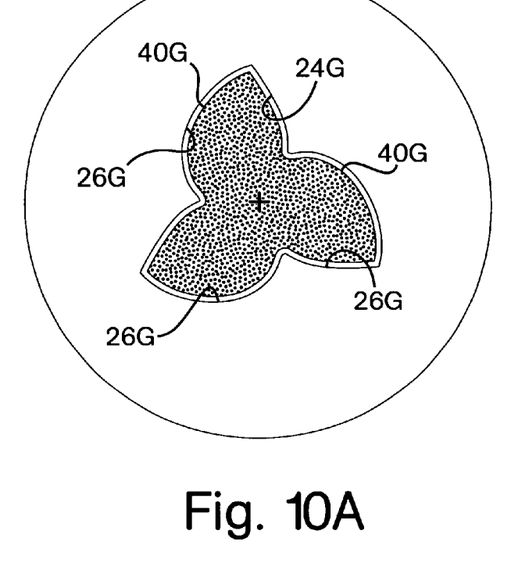
FIG. 10A is a diagrammatic top view of a screw having a recess in accordance with the invention in which the wings of the screw provided with asymmetrically configured spiral installation and removal walls adapted to develop more torque in a counterclockwise (removal) direction than in a clockwise (installation) direction, and further showing the driver in cross-section.
Figure 10B:
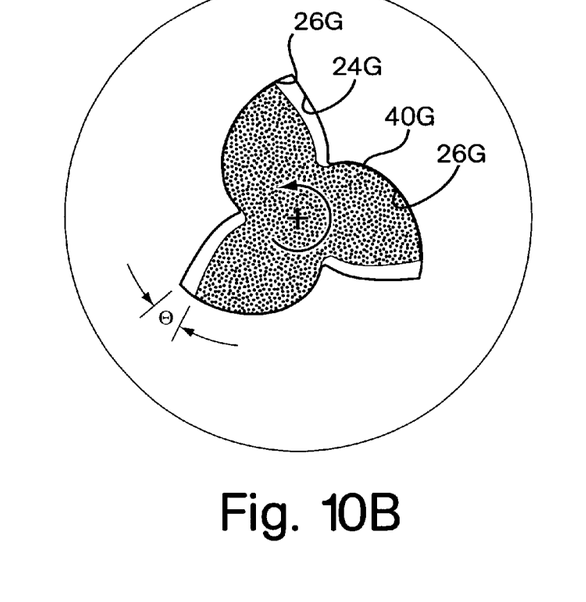
FIG. 10B is an illustration of the screw and driver of FIG. 10A in which the driver has been rotated, counterclockwise, in a removal direction, with the spiral removal walls of the driver and recess in engagement.

FIGS. 10A and 10B illustrate a multiwinged drive system in which the wings (three are shown for illustration) include spiral drive walls both in the installation and the removal directions but in which one of the drive walls in each wing is of greater torque capacity than the other. The embodiments illustrated in FIGS. 10A and 10B provide greater torque capacity in the removal direction because the removal drive walls have a greater arc length and corresponding area than do the installation drive walls. Because the forces are applied over a greater surface area in the removal direction greater torque may be applied in that direction.

Figure 11A:
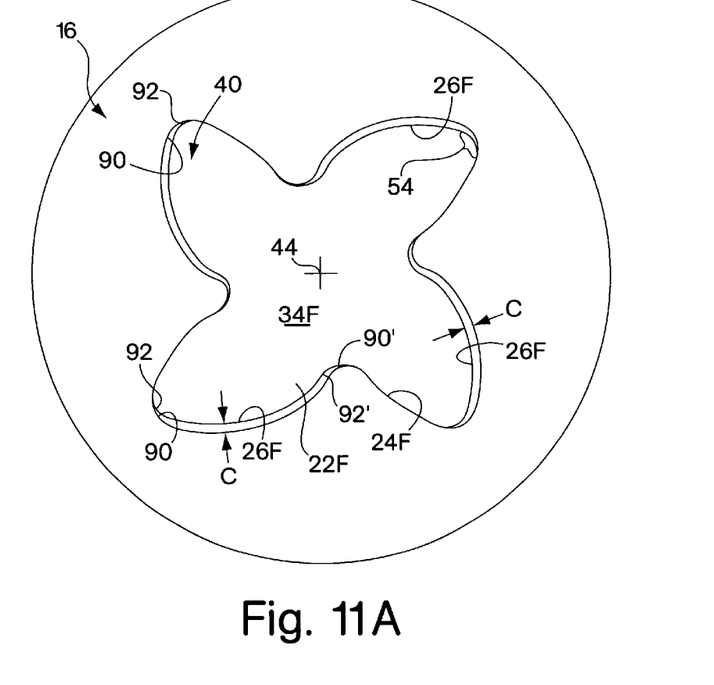
FIG. 11A is a diagrammatic top view of a multiwinged recess screw and driver in which the engageable faces of the screw and driver in one rotated sense are formed in a constant gap spiral configuration and the proposed drive walls are formed with a different spiral configuration, further illustrating the installation walls of the driver having been rotated into engagement with the installation walls of the recess.
Figure 11B:
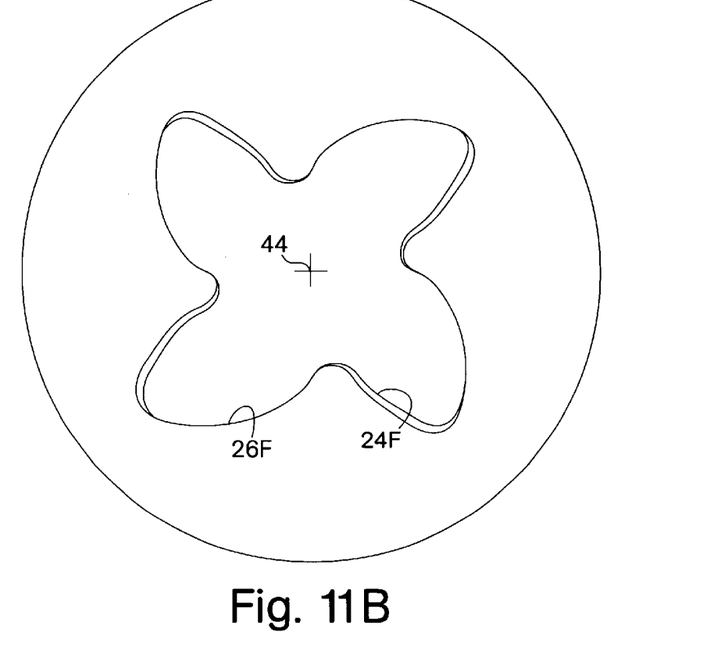
FIG. 11B is an illustration similar to FIG. 11A but in which the driver has been rotated counterclockwise relative to the screw head to engage the constant gap spiral surfaces of the driver and recess.
Figure 12A:
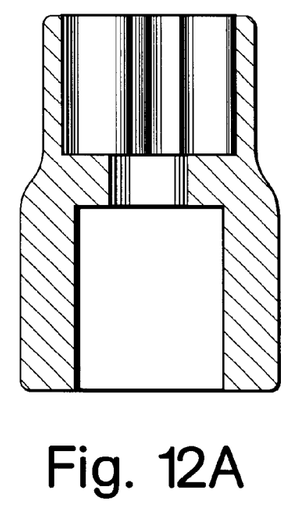
FIG. 12A is a sectional illustration of a driving tool for use with an external driver fastener in which the driving tool has a recess embodying the invention.
Figure 12B:
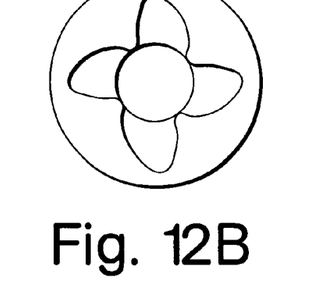
FIG. 12B is an end view of the driver of FIG. 12A showing the configuration of the recess.
Figure 13A:
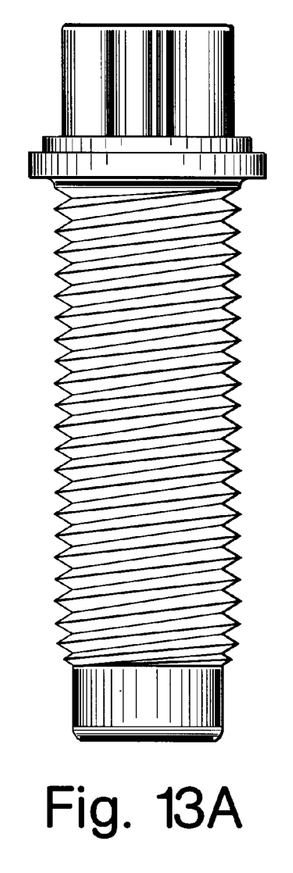
FIG. 13A is a side view of a fastener having externally driven surfaces on the head of the driver.
Figure 13B:
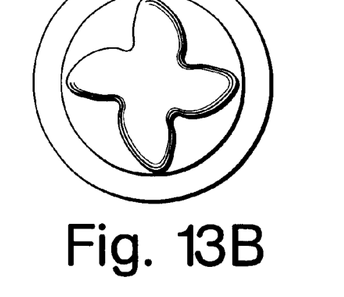
FIG. 13B is an end view of the head of the fastener of FIG. 13A showing the configuration of the externally driven surfaces.

Although the invention may be most efficiently practiced with the constant gap spiral described above, systems may be provided that incorporate spirals that vary somewhat from the most preferable substantially constant gap spiral while still providing significant advantages over the prior art. FIGS. 11A and 11B illustrate an example of such recess and driver 34F in which the recess includes four wings 22F, each having a removal drive wall 26F configured to have a constant gap spiral and an installation drive wall 24F having a different spiral configuration that is oriented to direct the major proportion of force from the driver to the recess in a torque producing direction. The transitions 90, 91, 92, 92' of the installation and removal surfaces on each of the driver and recess wings may be formed in an arcuate contour. For all of the embodiments, it is desirable that a sufficiently generous clearance be provided, suitable for the particular application, between the driving surfaces of the driver and those of the recess. Unlike prior art systems in which a substantial clearance between the envelope defined by the driver surface and the recess envelope tends to exaggerate the high concentration of stresses at a point or line contact, the present invention is substantially unaffected by such generous clearances because the clearance is taken up uniformly as the spirally configured drive surfaces are rotated through the clearance angle 74 into engagement with the mating spiral recess surfaces. By way of example, a clearance gap of the order of 0.002 to about 0.004 inches fully about and between the driver envelope and the recess envelope should not significantly adversely affect the torque capacity of the system.

The depth of the recess may depend on the shape and dimensions of the screw head and the shank, the material from which the fastener is made as well as the other dimensions of the recess. The depth should be selected to retain adequate screw head strength, particularly with 100° flat head screws 71 in which the relatively shallow flat head typically leaves little material into which the recess may penetrate before the strength of the juncture between the head and the shank is compromised. Where the present invention may be used to provide enhanced torque capability resulting from broad surface area contact between the driver and recess, even at shallow recess depths, high driving torques may be enabled even in such flat head screws without compromising the strength of the screw head.

The drivers and recesses of the present invention may be manufactured in a conventional two-blow header machine. The punch typically will be formed to include a body and a nib that corresponds substantially to the geometry of the driver, illustrated in FIG. 2. Because of the inherent difficulties in manufacturing recesses having perfectly vertical walls, some positive draft in the recess walls, possibly of the order of 1°, may result even if precise vertical walls are attempted to be made. Such slight taper should not significantly affect the performance of the spiral contoured drive system. Moreover, it may be desirable to form the recess to intentionally include a greater positive draft; for example, the draft of the wall could be increased to approximately 5° to 6° from the vertical without significantly diminishing the benefits of the invention. Punches may be formed according to conventional punch-forming techniques such as use of hobbing dies. Drivers in accordance with the invention also can be manufactured using conventional techniques, such as by stamping a driver blank with one or more shaped dies to form the desired shape wings or, by milling the driver bit using specially shaped milling cutters.

It also should be understood that the foregoing description of the invention is intended merely to be illustrative thereof and that other embodiments, modifications and equivalents may be apparent to those skilled in the art without departing from its spirit.

Having thus described the invention, what I desire to claim and secure by Letters Patent is:

1. A driver for driving a recess headed fastener, the device having a longitudinal axis, and comprising:

a shank, a nib formed at the end of the shank, the nib having a central portion and a plurality of wings radiating outwardly from the central portion, each of the wings having an installation wall and a removal wall, the wings being configured so that at least one of the installation or removal walls defines a segment of a spiral that has an initial point spaced from the longitudinal axis by an initial radius and extends to an outer terminal point at a radius that is no more than about 3.5 times that of the initial radius.

2. A driver as defined in claim 1 wherein no portion of the spiral segment has a tangent to which a perpendicular line makes an angle to a radius from the longitudinal axis to the point of tangency that is less than 17°.

3. A driver for driving a recess head fastener as defined in claim 1 wherein the spiral comprises a constant gap spiral.

4. A driver as defined in claim 1 wherein the spiral is defined by the equation:

$$\theta = \sqrt{(R/R_i)^2 - 1} + \operatorname{Arcsin}(R/R_i)^{-1} - (\pi/2)$$

where:

θ=the rotation angle (in radians) of ray crossing the curve at a distance R from the axis of rotation;

$R_i$=the initial radius as measured from the axis of rotation to the initial point of the spiral; and R=the radius of the spiral at a rotation angle θ, also measured from the axis of rotation.

5. A driver as defined in claim 4 wherein the spiral segment defined by the drive wall extends from the initial point to an outer terminal point that lies at a radius that is about three times that of the initial radius.

6. A driver as defined in claim 2 wherein the spiral segment defined by drive wall extends from the initial point to an outer terminal point that lies at a radius that is about two times that of the initial radius.

7. A driver as defined in claim 1 wherein the arc circumscribed by the spiral drive wall is no more than about 125°.

8. A driver as defined in claim 1 wherein the arc circumscribed by the spiral drive wall is no more than about 90°.

9. A driver as defined in claim 1 wherein the arc circumscribed by the spiral drive wall is no more than about 45°.

10. A driver as defined in claim 1 wherein each of the wings has an installation wall and a removal wall and wherein the removal wall has said spiral configuration.

11. A driver as defined in claim 1 wherein each of the wings has an installation wall and a removal wall and wherein the installation wall is configured to include said spiral.

12. A driver as defined in claim 1 wherein each of the wings has an installation wall and a removal wall and a removal wall and wherein both of the installation and removal walls have said spiral configuration.

13. A driver as defined in any one of claims 10–12 wherein one of the walls is configured to have a greater torque capacity than the other.

14. A driver for a threaded fastener having a longitudinal axis and a head, the driver having a longitudinal axis comprising:

a shank having a recess formed at its end, the recess having a central portion and a plurality of wings radiating outwardly from the central portion, each of the wings having an installation wall and a removal wall, the wings being configured so that at least one of the installation or removal walls defines a segment of a spiral that has an initial point spaced from the longitudinal axis of the driver by an initial radius and extends to an outer terminal point at a radius no more than about 3.5 times that of the initial radius.

15. A driver as defined in claim 14 wherein no portion of the spiral segment has a tangent to which a perpendicular line makes an angle to a radius from the longitudinal axis to the point of tangency that is less than 17°.

16. A driver as defined in claim 14 wherein the spiral comprises a constant gap spiral.

17. A driver as defined in claim 14 wherein the spiral is defined by the equation:

$$\theta = \sqrt{(R/Ri2 - 1 + \operatorname{Arcsin}(R/R_i)^{-1}} - (\pi/2)$$

where:

θ=the rotation angle (in radians) of a ray crossing the curve at a distance R from the axis of rotation;

$R_i$=the initial radius of the spiral at a rotation angle θ, also measured from the axis of rotation;

R=the radius of the spiral at a rotation angle θ, also measured from the axis of rotation.

* * * * *

UNITED STATES PATENT AND TRADEMARK OFFICE
CERTIFICATE OF CORRECTION

PATENT NO. : 6,367,358 B1
APPLICATION NO. : 09/356156
DATED : April 9, 2002
INVENTOR(S) : W. Dodd Stacy It is certified that error appears in the above-identified patent and that said Letters Patent is hereby corrected as shown below:

Claim 12 should read as follows:
　　12. A driver as defined in claim 1 wherein each of the wings has an installation wall and a removal wall and wherein both of the installation and removal walls have said spiral configuration.

Claim 17 should read as follows:
　　17. A driver as defined in claim 14 wherein the spiral is defined by the equation:
$$\theta = \sqrt{(R/R_i)^2 - 1} + Arcsin\ (R/R_i)^{-1} - (\pi/2)$$

where:
$\theta$ = the rotation angle (in radians) of a ray crossing the curve at a distance R from the axis of rotation;
$R_i$ = the initial radius of the spiral at a rotation angle $\theta$, also measured from the axis of rotation;
$R$ = the radius of the spiral at a rotation angle $\theta$, also measured from the axis of rotation.

Signed and Sealed this

First Day of May, 2007

JON W. DUDAS
*Director of the United States Patent and Trademark Office*